(12) United States Patent
Krauss et al.

(10) Patent No.: US 12,754,283 B2
(45) Date of Patent: Oct. 6, 2026

US012754283B2

(54) METHODOLOGY FOR DESIGNING MILLIMETER-WAVE SIMULANTS WITH LOW LOSS POWDERS

(71) Applicant: The Government of the United States of America, as represented by the Secretary of Homeland Security, Washington, DC (US)

(72) Inventors: Ronald Krauss, Galloway, NJ (US); Michael Brogden, Galloway, NJ (US); Joseph McNamara, Egg Harbor City, NJ (US); Jeffrey Brian Barber, Vineland, NJ (US); Barry Thomas Smith, Egg Harbor City, NJ (US); James Christopher Weatherall, Linwood, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 766 days.

(21) Appl. No.: 16/230,042

(22) Filed: Dec. 21, 2018

(65) Prior Publication Data

US 2019/0195988 A1 Jun. 27, 2019

Related U.S. Application Data

(60) Provisional application No. 62/608,944, filed on Dec. 21, 2017.

(51) Int. Cl.

*G01S 7/40* (2006.01)
*C06B 23/00* (2006.01)

(Continued)

(52) U.S. Cl.

CPC ................ *G01S 7/40* (2013.01); *C06B 23/00* (2013.01); *C08L 91/08* (2013.01); *G01S 7/411* (2013.01); *G01S 13/887* (2013.01); *G01S 7/4052* (2013.01)

(58) Field of Classification Search

None

See application file for complete search history.

(56) References Cited

U.S. PATENT DOCUMENTS 3,119,705 A * 1/1964 Kintish ................ G01N 33/227 106/266
8,563,316 B2 10/2013 Duffy et al.

(Continued)

OTHER PUBLICATIONS

Study of Landau-Lifshitz-Looyenga's formula for dielectric correlation between powder and bulk, D C Dube 1970 J. Phys. D: Appl. Phys. 3 1648 (Year: 1970).*

(Continued)

*Primary Examiner* — Aileen B Felton

(74) *Attorney, Agent, or Firm* — Kelly G. Hyndman; Robert W. Busby

(57) ABSTRACT

Various embodiments of the present invention are directed towards a simulant and method relating to producing a simulant. For example, a simulant of a target threat includes at least one component ingredient characterized by a corresponding component loss factor that is essentially zero. The simulant is configured to exhibit a simulant dielectric constant corresponding to a simulant reflectivity substantially equivalent to a threat reflectivity. A method of producing a simulant of a target threat includes generating an ellipse-like curved solution space corresponding to a plurality of candidate threat reflectivities, identifying a threat dielectric constant, from among respective threat dielectric constants of the candidate threat reflectivities forming the curved (Continued)

solution space, and identifying at least one weight proportion of at least one corresponding simulant ingredient.

14 Claims, 4 Drawing Sheets

(51) Int. Cl.

| | |
|---|---|
| ***C08L 91/08*** | (2006.01) |
| ***G01S 7/41*** | (2006.01) |
| ***G01S 13/88*** | (2006.01) |

(56) References Cited

U.S. PATENT DOCUMENTS 8,946,641 B2 2/2015 Smith et al.
2009/0194744 A1* 8/2009 Adebimpe ............ F41H 11/134 252/408.1
2014/0070111 A1* 3/2014 Rappaport ........... G01N 33/227 250/336.1
2016/0146872 A1* 5/2016 Weatherall ............. G01N 22/00 324/633

OTHER PUBLICATIONS

Jeffrey Barber, et al., "Millimeter Wave Measurements of Explosives and Simulants", Passive Millimeter-Wave Imaging Technology XIII, Proc. of SPIE vol. 7670, 76700E, pp. 76700E-1-76700E-7, 2010.

* cited by examiner

METHODOLOGY FOR DESIGNING MILLIMETER-WAVE SIMULANTS WITH LOW LOSS POWDERS

CROSS-REFERENCE TO RELATED APPLICATIONS

This application claims the benefit of U.S. Provisional Application No. 62/608,944 entitled "Methodology for Designing Millimeter-Wave Simulants with Low Loss Powders," filed on Dec. 21, 2017, incorporated herein by reference in its entirety.

STATEMENT OF GOVERNMENT INTEREST

The present invention was made by one or more employees of the United States Department of Homeland Security in the performance of official duties, and, thus the claimed invention may be manufactured, used, licensed by or for the United States without the payment of any royalties thereon.

FIELD OF THE INVENTION

The present invention relates generally to the field of simulants, and more specifically to the field of simulants to serve as surrogates to hazardous threats and explosives for training and testing purposes.

BACKGROUND OF THE INVENTION

Simulants have evolved due to improvements in detector technology and stricter requirements from government agencies. Simulants are needed for both training and testing explosive detection systems (EDSs) and advanced imaging technology (AIT) portals. The simulants are used in place of live explosives in locations where live explosives cannot be used due to concerns of public safety. Simulants are manufactured to produce detector responses, e.g., an indication of a threat object based on reflectivity, which are the same as live threats. In Millimeter-Wave (MMW) advanced imaging technology (AIT) systems/portals, the reflectivity of an object is related to its complex relative permittivity.

Historical development of simulants consisted of materials being measured and combined in attempts to generate a simulant that would match the system response/signal of a target explosive threat's system response/signal. This trial and error approach of matching the complex relative permittivity of the threat can be challenging if materials with significant loss factors are used because a simulant's accuracy can depend on its ability to generate a system response/signal that can match a dielectric constant ($\varepsilon'$) and/or loss factor ($\varepsilon''$).

SUMMARY OF THE INVENTION

In an example embodiment, a simulant (of a target threat having a threat reflectivity) includes at least one component ingredient. A given component ingredient is characterized by a corresponding component loss factor that is essentially zero, and a corresponding component dielectric constant. The simulant is configured to exhibit a simulant loss factor of essentially zero and a simulant dielectric constant based on a component ratio by total weight of the at least one component ingredient. The simulant dielectric constant, corresponding to a cumulative contribution of the component dielectric constant at the component ratio, corresponds to a simulant reflectivity substantially equivalent to the threat reflectivity.

In another example embodiment, a method of producing a simulant of a target threat includes determining a component ratio, and combining the component(s). The component ratio by weight of the simulant for at least one component ingredient is determined, wherein a given component ingredient is characterized by a corresponding component loss factor that is essentially zero, and a corresponding component dielectric constant is also determined. The at least one component ingredient is mixed to cause the simulant to be configured to exhibit a simulant loss factor of essentially zero, and exhibit a simulant dielectric constant according to the component ratio of the at least one component ingredient. The at least one component ingredient is mixed also to cause the simulant dielectric constant, corresponding to a cumulative contribution of the component dielectric constant at the component ratio, to correspond to a simulant reflectivity substantially equivalent to the threat reflectivity.

In yet another example embodiment, a method of producing a simulant of a target threat having a threat reflectivity includes generating an ellipse-like curved solution space, identifying a threat dielectric constant, and identifying at least one weight proportion of a corresponding at least one simulant ingredient. The ellipse-like curved solution space corresponding to a plurality of candidate threat reflectivities is generated wherein a given threat reflectivity is associated with a respective threat dielectric constant and threat loss factor. The curved solution space is based on expressing the threat reflectivity in terms of a complex index of refraction expressed in terms of dielectric constant and loss factor. The threat dielectric constant is identified from among respective threat dielectric constants of the candidate threat reflectivities forming the solution space, based on reducing the curved solution space to the threat dielectric constant located at an intercept of a dielectric constant axis in the ellipse-like curved solution space. The at least one weight proportion of a corresponding at least one simulant ingredient is identified based on generating an ingredient solution space corresponding to a plurality of different combinations of the at least one simulant ingredient to satisfy a Landau-Lifshitz-Looyenga (LLL) mixture equation expressed in terms of the threat dielectric and characteristics of the at least one simulant ingredient corresponding to a dielectric constant, a density, and a weight proportion of each respective simulant ingredient of the at least one simulant ingredient.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more example embodiments of the present invention are described in detail with reference to the following drawings. These drawings are provided to facilitate understanding of the present invention and should not be read as limiting the breadth, scope, or applicability thereof. For purposes of clarity and ease of illustration, these drawings are not necessarily made to scale.

These drawings are not intended to be exhaustive or to limit the invention to the precise form(s) disclosed. It should be understood that the present invention can be practiced with modification and alteration, and that the invention is limited only by the claims and the equivalents thereof.

DETAILED DESCRIPTION OF THE INVENTION

Simulants can be produced as surrogates to hazardous threats and explosives, to use the simulants for training and testing, e.g., on advanced imaging technology (AIT) portals. In Millimeter-Wave (MMW) AIT personnel screening portals, the reflectivity of a threat is a function of its complex permittivity which represents the dielectric constant (ε') and the loss factor (ε"), also referred to as the real and imaginary components, respectively. Example approaches described herein can be used to formulate simulants (e.g., MMW simulants) having desired target reflectance values, without a need for excessive trial-and-error iterations.

Figure 1:
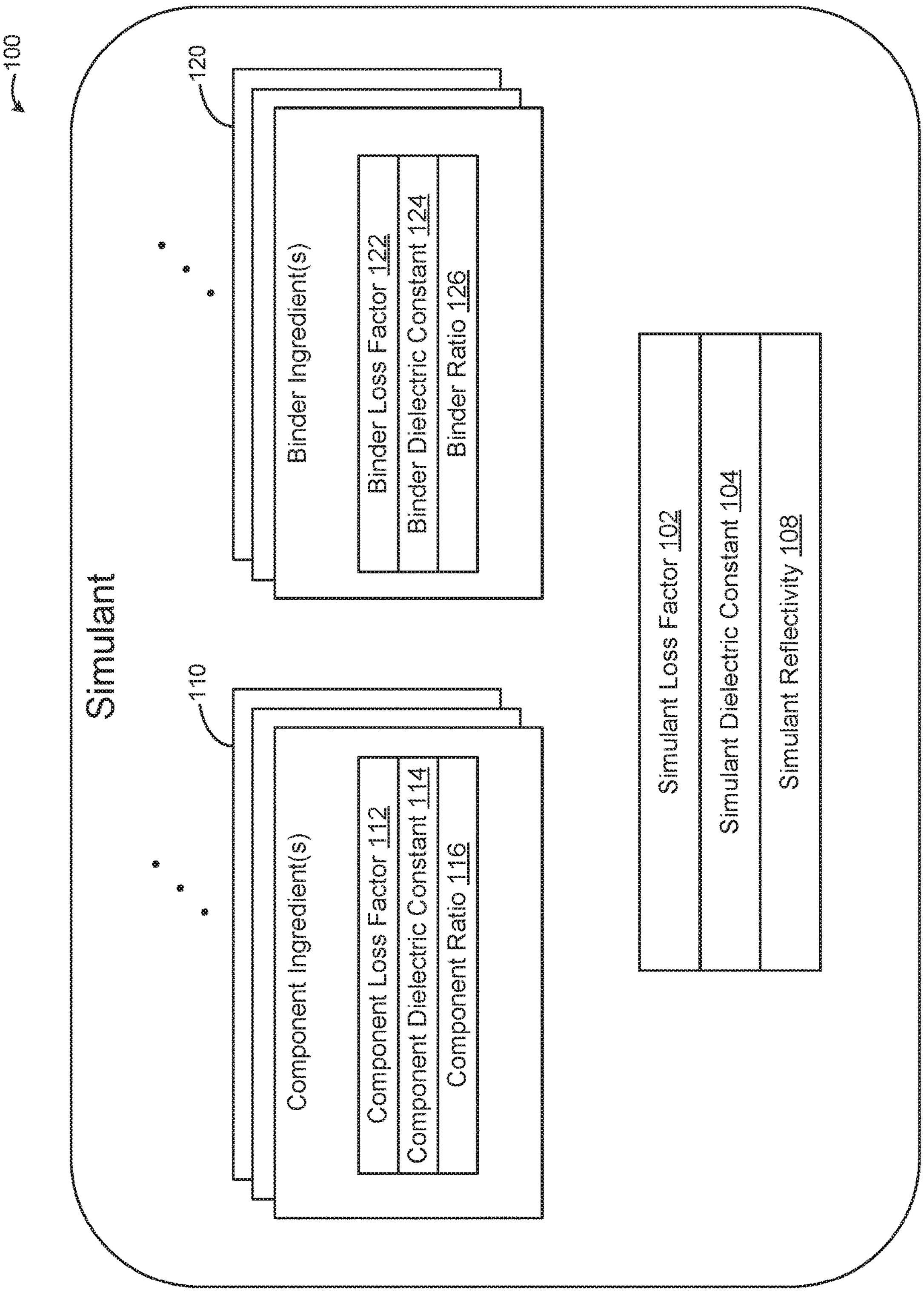
FIG. 1 illustrates a simulant of a target threat according to an example embodiment.

FIG. 1 illustrates a simulant 100 of a target threat according to an example embodiment. The simulant 100 includes at least one component ingredient 110, and at least one binder ingredient 120. The simulant 100 is associated with a simulant loss factor 102, a simulant dielectric constant 104, and a simulant reflectivity 108. The at least one component ingredient 110 is associated with a component loss factor 112, a component dielectric constant 114, and a component ratio 116. The at least one binder ingredient 120 is associated with a binder loss factor 122, a binder dielectric constant 124, and a binder ratio 126.

Morphology of the simulant 100 can be based on the ratios of the ingredients 110 and/or binders 120. The example simulant designs described herein include morphologies such as liquid, dry powder, "wet" powder, cast, pressed, gel, paste, putty, rubbery, and flake. The group of {gel, paste, putty, and rubbery} is regarded as a semisolid group. Putty morphologies can vary, based on the putty's tendency to flow and other related quantitative characteristics (e.g., stiff putty, soft emulsion, and other variations). Flake morphology can be made by taking a liquid or suspension and having it solidify into a very thin layer, then breaking it up into flakes. The suspension can have undissolved powder in it, and can also potentially be allowed to solidify as a solid block resulting in cast material. The dry and wet powders, semisolids, and pressed can be obtained as follows. Dry powders are obtained by producing mixtures of other dry powders such as the base ingredients. Wet powders are dry powders with a liquid component, e.g., dynamite. The liquid can also be considered as a binder in example morphologies. The pressed morphology is a powder mixture that includes a powder binder which is then pressed into a solid block. Depending on the quantity of binder, one can take the low-loss powders with a binder (not necessarily low-loss) and press it into a solid block. Then one can also break/grind up the solid block and add texture components. Additional morphologies can be achieved by using applicable morphology-affecting ingredients having a low loss factor, such as stearic acid (melted, powdered) and/or petrolatum.

Commercial powders are available with specific ε' (identified as K values) from 2.5 to 27 with a combination of petrolatum and stearic acid, both consisting of loss tangents that are essentially zero (see the description set forth below regarding FIG. 4 for examples of different types of values corresponding to essentially zero in the context of example embodiments), simplifies the simulant-explosive matching process. The simulant formulations need only match the target threat's dielectric constant at an essentially zero loss (ε"=0) which is feasible by using a modified Landau-Lifshitz-Looyenga (LLL) mixture equation. The resultant ellipse-like curved solution space is reduced from two variables to one, and solved with a quadratic equation by matching ε' with a set of essentially lossless simulant ingredients.

Figure 2:
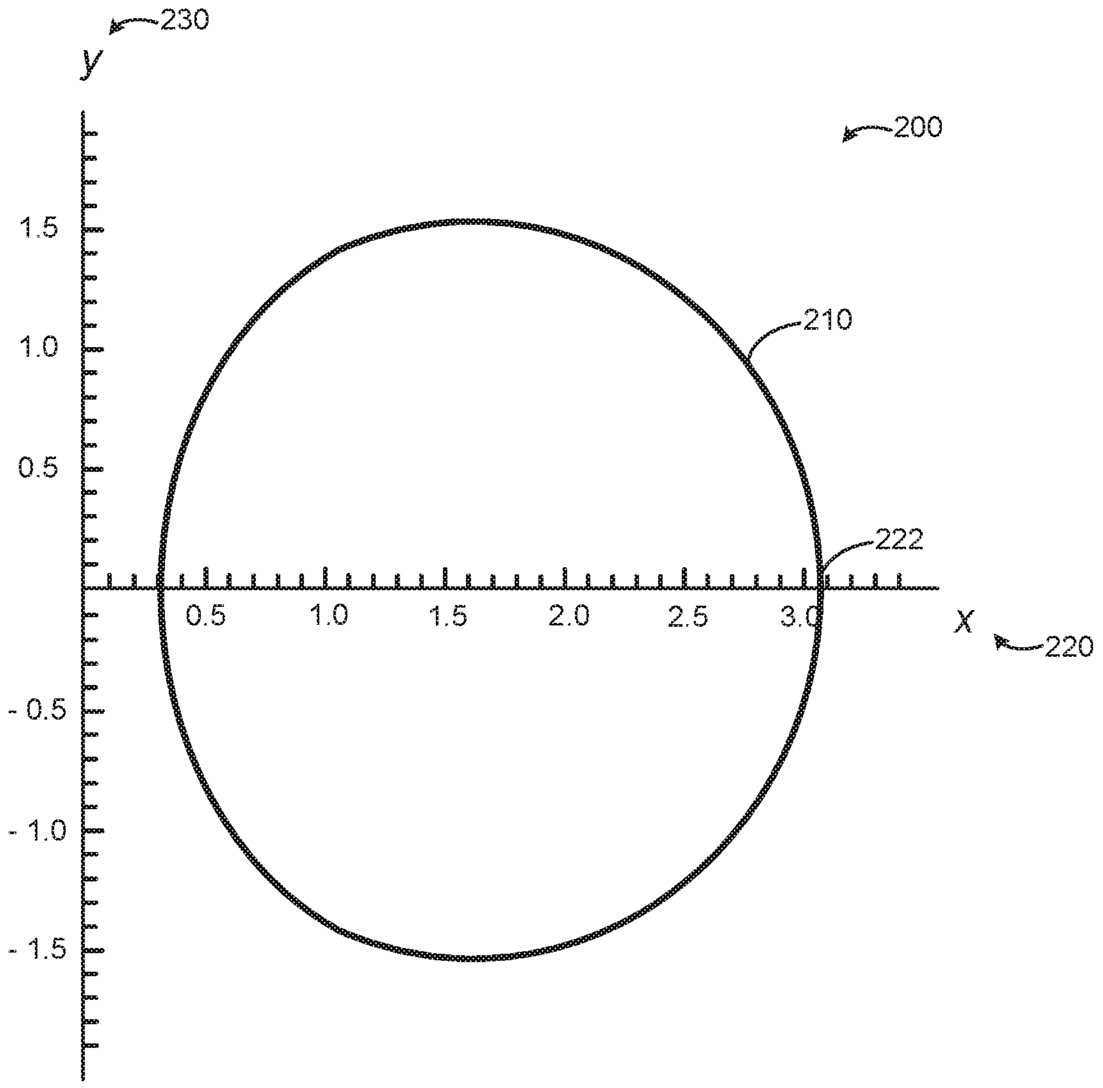
FIG. 2 illustrates a graph of an ellipse-like curved solution space for threat reflectivity according to an example embodiment.

FIG. 2 illustrates a graph 200 of an ellipse-like curved solution space 210 for threat reflectivity according to an example embodiment. The x-axis 220 represents values of a dielectric constant ε', and the y-axis 230 represents values of a loss factor ε". The solution space 210 is associated with an x-intercept 222, corresponding to the illustrated value of dielectric constant (ε') equal to 3.080 at zero loss (FIG. 2 illustrates an example graph for Semtex H; see solution and equations provided below, for the specific equations used to generate the ellipse-like solution space of possible simulant choices (x=ε', y=ε") that substantially match the reflectivity of Semtex H (R=0.075)).

Complex permittivity can be used in MMW AIT systems as a measurement of reflectivity in a function of ε' and ε" resulting in the illustrated ellipse-like curved solution space. The dielectric constant and loss factor corresponding to the threat represent a point on that solution space along with an infinite number of other combinations of ε' and ε" that produce the same reflectivity. To isolate one of the infinite possible solutions, example approaches identify the intercept of the ε" axis or zero loss (set ε"=0) dielectric constant, which constrained solution will have the equivalent reflectivity as that of any point falling on the solution space. Setting ε" to zero also has an effect on the underlying equation used to represent complex reflectivity and accordingly reducing the underlying equation, by using a quadratic formula, a solution for ε' can be solved. This reduces the problem significantly, resulting in a need to match only the dielectric constant (ε') of the simulant to that of the threat.

More specifically, the dielectric constant (ε') is directly related to the optical properties with the complex index of refraction of the medium (N) defined as:

$$N=\sqrt{\varepsilon'-j\varepsilon''}=n+jk$$

where n is the normal refractive index and k is the extinction coefficient. Rather than measure n and k directly, the reflectivity (R) can be measured, which is defined as:

$$R=\left|\frac{1-N}{1+N}\right|^2=\frac{(1-n)^2+k^2}{(1+n)^2+k^2}$$

for reflectivity at normal incidence only. In general the formula becomes more complicated per below for non-normal incidence. The equation for reflectivity in terms of ε' and ε" is:

$$1 - R + (1 - R)\sqrt{\varepsilon'\varepsilon' + \varepsilon''\varepsilon''} - (1 + R)\sqrt{2\sqrt{\varepsilon'\varepsilon' + \varepsilon''\varepsilon''} + 2\varepsilon'} = 0$$

which represents an ellipsoid-like solution space for the complex dielectric constant (ε' and ε") that will produce the desired reflectivity. The process of finding a simulant according to the example approaches described herein involve finding a material whose complex dielectric constant falls on the illustrated ellipsoid-like solution space. Using K powders and binders with very low loss, e.g., essentially zero loss, simplifies the problem even further by zeroing out the loss factor (ε"). This reduces the equation for reflectivity to a quadratic equation of one variable which can be solved to obtain the dielectric constant at zero loss, and matches the reflectivity of the threat, as follows:

$$(1-R)\varepsilon'-2(1+R)\sqrt{\varepsilon'}+(1-R)=0$$

The square of the positive root of this equation will yield the dielectric constant with a zero loss factor (ε"=0) that matches the reflectivity of the threat material. The square of the negative root will result in a number less than 1 which is undefined for dielectric constants.

The Landau-Lifshitz-Looyenga (LLL) mixture equation results in a scaling of complex permittivity with volume fraction which can be converted to mass fraction ($w_i$) using the density ($\rho_i$) and complex permittivity of each component as follows:

$$\varepsilon = \varepsilon' - j\varepsilon''$$

$$\varepsilon_{mixture}^{1/3} = \frac{\Sigma_i w_i \frac{\varepsilon_i^{1/3}}{\rho_i}}{\Sigma_i w_i \frac{1}{\rho_i}}$$

This mixture equation allows for finding multiple solutions for a given mixture. For example, if a group of ingredients are known with weight proportions $w_i$ and densities $\rho_i$, the $\varepsilon_i$ of each ingredient is known, then it is possible to calculate the $\varepsilon_{mixture}$ using the LLL equation. Then, it is possible to calculate the reflectivity of the mixture using the quadratic equation, where this invention assumes ε" is equal to or essentially approaching zero. However, if a desired reflectance value R is known, it is possible to use the quadratic equation to find multiple solutions for $\varepsilon_{mixture}'$ when ε"=0. For a given value of R, and hence $\varepsilon_{mixture}$, for n ingredients, one equation accommodates n unknowns, which are the $w_i$.

This allows one to predict the dielectric properties of a mixture based on knowing the properties of its components. By using lossless simulant materials and reducing the equation for reflectivity to one variable, one simplifies the problem of matching the reflectivity of a threat material. An example problem can have, e.g., a 4- or 5-dimensional solution space (corresponding to 4 or 5 ingredients), where there is a "surface" that will satisfy the equations. An analytical tool such as Mathematica can be used to determine the potential combinations for the solution. In an alternate example, the tool MATLAB® can be used to create a graphical user interface, where the target threat R value can be set, and the ingredients, the dielectric values, the weight proportions, etc. can be adjusted to view the effect on the solution space. For example, as the weight proportions are adjusted/restricted, the solution space becomes more restricted, until constraining the last ingredient which should have very few, perhaps one or two, values that will fit the constrained solution space. Experiments can be performed where the solution space of different ingredients is bound based on desiring to achieve a given morphology(ies), then those parameters can be used to more easily constrain the n-dimensional problem until arriving at the final solution. Alternatively, an optimization calculation can be used, guiding that process in a similar fashion. Certain parameters can be fixed while varying others.

Figure 3:
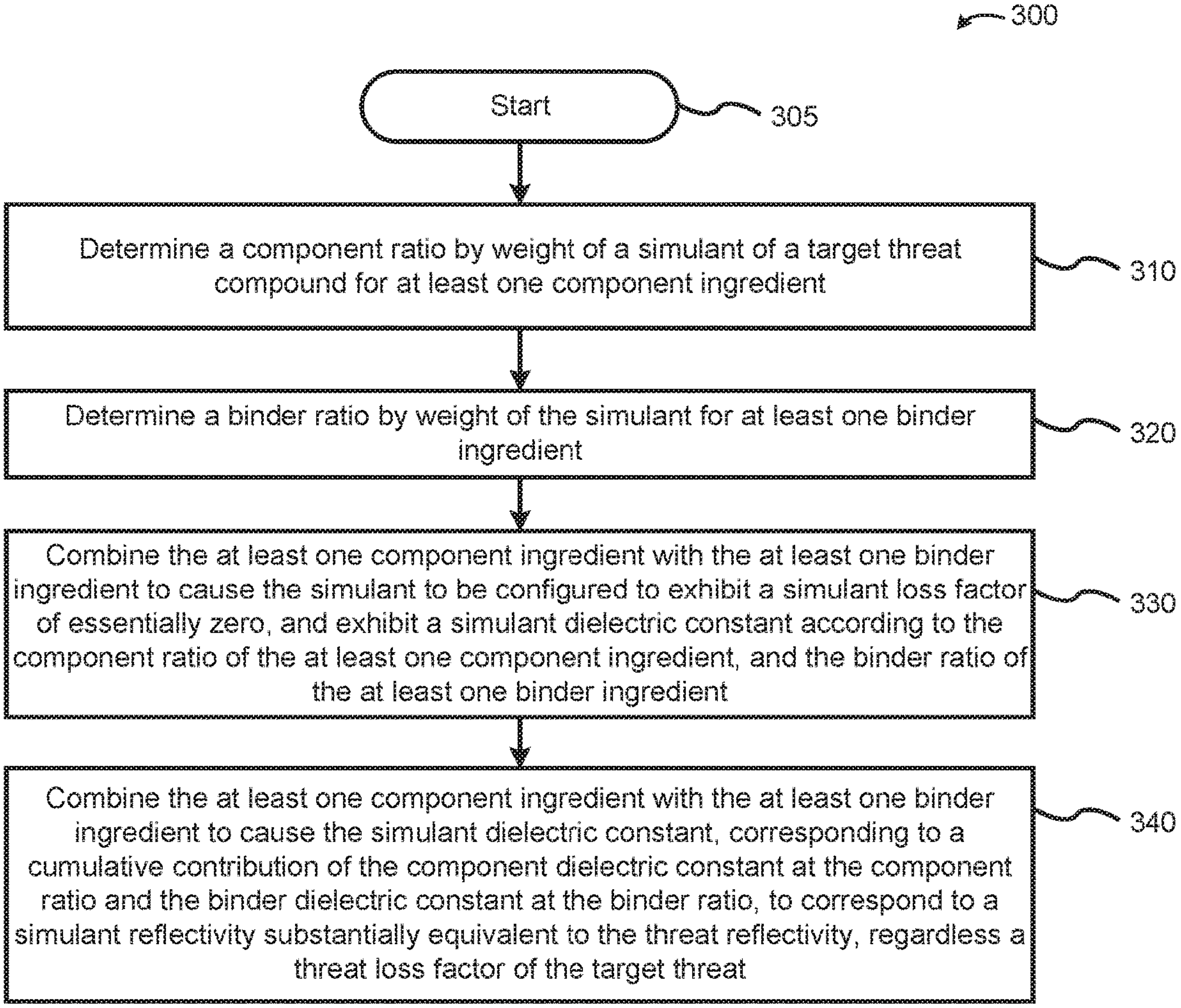
FIG. 3 illustrates a method of producing a simulant of a target threat according to an example embodiment.

FIG. 3 illustrates a method 300 of producing a simulant of a target threat according to an example embodiment. Flow begins in block 305. In block 310, a component ratio by weight of the simulant for at least one component ingredient is determined. For example, a given component ingredient is characterized by a corresponding component loss factor that is essentially zero (see below for examples of essentially zero), and a component dielectric constant.

In block 320, a binder ratio by weight of the simulant for at least one binder ingredient is determined. For example, a given binder ingredient is characterized by a corresponding binder loss factor that is essentially zero, and binder dielectric constant.

In block 330, the at least one component ingredient is combined with the at least one binder ingredient to cause the simulant to be configured to exhibit a simulant loss factor of essentially zero, and exhibit a simulant dielectric constant according to the component ratio of the at least one component ingredient, and the binder ratio of the at least one binder ingredient.

In block 340, the at least one component ingredient is combined with the at least one binder ingredient to cause the simulant dielectric constant, corresponding to a cumulative contribution of the component dielectric constant at the component ratio and the binder dielectric constant at the binder ratio, to correspond to a simulant reflectivity substantially equivalent to the threat reflectivity.

Figure 4:
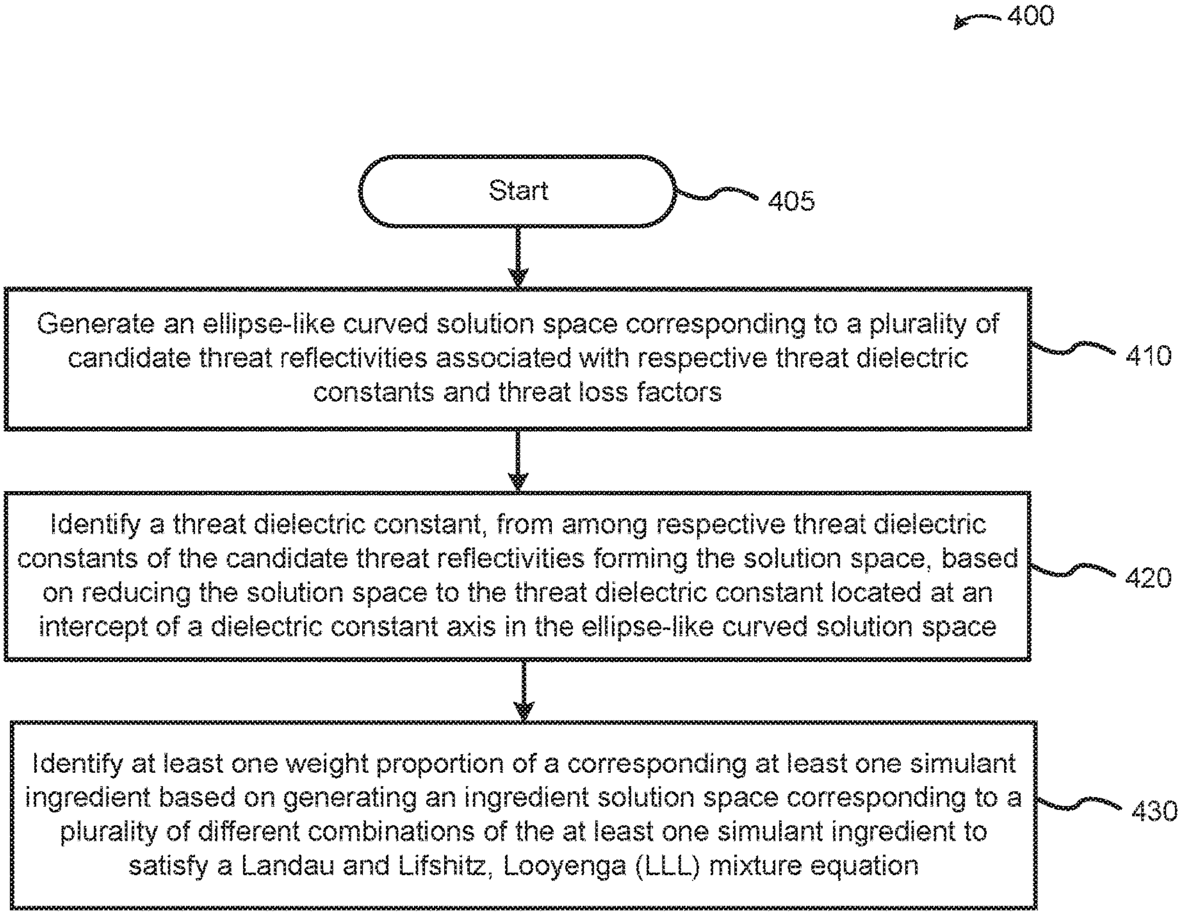
FIG. 4 illustrates a method of producing a simulant of a target threat having a threat reflectivity according to an example embodiment.

FIG. 4 illustrates a method 400 of producing a simulant of a target threat having a threat reflectivity according to an example embodiment. Flow begins in block 405. In block 410, an ellipse-like curved solution space corresponding to a plurality of candidate threat reflectivities is generated. For example, a given threat reflectivity is associated with a respective threat dielectric constant and threat loss factor. In another example, the solution space is based on expressing the threat reflectivity in terms of a complex index of refraction expressed in terms of dielectric constant and loss factor.

In block 420, a threat dielectric constant is identified, from among respective threat dielectric constants of the candidate threat reflectivities forming the solution space, based on reducing the solution space to the threat dielectric constant located at an intercept of a dielectric constant axis in the ellipse-like curved solution space.

In block 430, at least one weight proportion of a corresponding at least one simulant ingredient is identified based on generating an ingredient solution space corresponding to a plurality of different combinations of the at least one simulant ingredient to satisfy a Landau-Lifshitz-Looyenga (LLL) mixture equation. For example, the solution space includes multiple ingredients and binders, each expressed in terms of the threat dielectric and characteristics of the at least one simulant ingredient corresponding to a dielectric constant, a density, and a weight proportion of each respective simulant ingredient of the at least one simulant ingredient.

In an example embodiment, the above-described approaches can be applied to produce a simulant of, e.g., Semtex H, which has a calculated reflectivity (R) of 0.075 at a frequency of 25 Gigahertz corresponding to the ellipse-like curved solution space shown in FIG. 2. Any point on the illustrated solution space in the first quadrant, having a value of ε' greater than 1 (by definition of dielectric constant) will result in the same reflectivity. This represents an infinite number of ε' and ε" pairs that give the same reflectivity value. The solution space is reduced by identifying an intercept on the x-axis, which is illustrated at x=3.077 (x=ε', y=ε').

A set of ECCOSTOCK® High K Powders can be selected with dielectric constant values (K=ε') ranging from 2.5 to 27 and are essentially lossless/zero (ε"<0.0007). In this context, the loss factor is essentially zero in terms of producing an effect to the reflectance that does not contribute to a substantially noticeable change that would be readily detected by a threat detection machine. For example, the threat detection machine would not alert with an alarm location on an avatar, or otherwise alert in a manner detectable by an agent operating the threat detection machine, in view of the magnitude of any essentially lossless/zero dielectric constant values. Additionally, the loss factor is essentially zero in terms of the interaction between ingredients that would result in an overall effect to the reflectance that is not substantially noticeable, e.g., where one ingredient raises the loss factor and another reduces the loss factor so that the contributing effects offset and result in essentially zero overall loss factor. In more general terms, a component and/or binder ingredient can be considered to have essentially zero loss factor ε" for values of ε" less than or equal to approximately 0.01.

Combining the K Powders with petrolatum and stearic acid, two binders that are also essentially lossless (ε"=0.0010 and 0.0002 respectively), a matrix or variety of solutions ranging from emulsions to putties and even solids (paraffin-wax-like) is achievable. Qualitative physical morphology tests (e.g., using an Instron universal test machine) can be performed to indicate that an exemplary binder ratio to achieve a putty morphology for the simulant is 20% petrolatum by total weight, and 20% stearic acid by total weight, melted together and mixed with the K powders of 60% by total weight. Lowering the petrolatum-stearic acid mixture results in a stiffer morphology whereas increasing it results in a morphology similar to wet sand.

Using the Semtex H target threat value, the optimal binder ratio for putties, and the high K powders, the simulant's theoretical reflectivity results in a dielectric constant (ε') equal to 3.080 at zero loss. The corresponding reflectivity of 0.075 can be achieved through a variety of combinations of the K Powders. Additionally, stearic acid can be added as a powdered filler to minimize the amount of K powder needed to achieve a given reflectivity.

The input equation is shown as follows, substituting for R=0.075:

$$0.925+0.925\sqrt{\varepsilon'\varepsilon'+\varepsilon''\varepsilon''}-1.075\sqrt{2\sqrt{\varepsilon'\varepsilon'+\varepsilon''\varepsilon''}+2\varepsilon'}=0$$

The result equation is achieved as follows, graphed as the ellipsoid-like solution space illustrated in FIG. 2, where x=ε' and y=ε":

$$0.925\sqrt{(\varepsilon')^2+(\varepsilon'')^2}-1.075\sqrt{2\sqrt{(\varepsilon')^2+(\varepsilon'')^2}+2\varepsilon'}+0.925=0$$

Three formulations with similar reflectivity values and morphology are listed in Table 1, corresponding to a target reflectivity of 0.075 at 25 GHz:

TABLE 1

| Theoretical Reflectivity | Ingredients | Amount (% w/w) |
|---|---|---|
| Formula 1: | Stearic Acid melted | 20 |
| Reflectivity 0.0735 | Petrolatum melted | 20 |
| Putty | K-7 | 46 |
| | K-12 | 8 |
| | K-27 | 6 |
| Formula 2: | Petrolatum melted | 20 |
| Reflectivity 0.0737 | Stearic Acid melted | 20 |
| | K-7 | 33 |
| | K-12 | 27 |
| Formula 3: | Stearic Acid melted | 20 |
| Reflectivity 0.0733 | Petrolatum melted | 20 |
| | Stearic Acid powdered | 19 |
| | K-27 | 41 |

Table 2 contains three formulations of different morphologies using these ingredients, for the same target reflectivity of 0.075 at 25 GHz:

TABLE 2

| Theoretical Reflectivity and Morphology | Ingredients | Amount (% w/w) |
|---|---|---|
| Formula 1: | Stearic Acid melted | 20 |
| Reflectivity 0.0733 | Petrolatum melted | 20 |
| Putty | Stearic Acid powdered | 19 |
| | K-27 | 41 |
| Formula 2: | Petrolatum melted | 23 |
| Reflectivity 0.0725 | Stearic Acid melted | 23 |
| Paste | Stearic Acid powdered | 14 |
| | K-12 | 40 |
| Formula 3: | Stearic Acid melted | 17 |
| Reflectivity 0.0742 | Petrolatum melted | 17 |
| Wet Sand-like | Stearic Acid powdered | 24 |
| | K-27 | 42 |

While a number of example embodiments of the present invention have been described, it should be appreciated that the present invention provides many applicable inventive concepts that can be embodied in a wide variety of ways. The example embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A method of producing a simulant mixture having a simulant reflectivity to match a threat reflectivity R of a target threat, comprising:

measuring the threat reflectivity R of the target threat;

converting a value of the threat reflectivity R to a value of a threat dielectric constant ε', by using the value of the threat reflectivity R in a reduced reflectivity equation expressed as $(1-R)\varepsilon'-2(1+R)\sqrt{\varepsilon'}+(1-R)=0$ and solving for the value of the threat dielectric constant ε', wherein the reduced reflectivity equation corresponds to a graph of a curved solution space representing ε' and ε" pairs of the threat reflectivity R reduced by assigning a value of zero to threat loss factor ε" consistent with an intercept of an x-axis of the graph;

assigning the value of the threat dielectric constant ε' to a variable $\varepsilon_{mixture}$ in a Landau-Lifshitz-Looyenga (LLL) mixture equation;

selecting, as first two simulant ingredients of the simulant mixture as represented by the LLL mixture equation, an equal percent by weight (% w/w) of stearic acid melted and petrolatum melted, thereby constraining the LLL mixture equation;

selecting specific % w/w for the first two simulant ingredients corresponding to a morphology for the simulant mixture to match the target threat, thereby constraining the LLL mixture equation by selecting a corresponding one of a set of percents by weight according to:

17% w/w stearic acid melted and 17% w/w petrolatum melted for wet sand-like morphology, 20% w/w stearic acid melted and 20% w/w petrolatum melted for putty morphology, or 23% w/w stearic acid melted and 23% w/w petrolatum melted for paste morphology;

selecting additional simulant ingredients from the group consisting of: stearic acid powdered, low loss dielectric filler powder of dielectric constant value 7, low loss dielectric filler powder of dielectric constant value 12, and low loss dielectric filler powder of dielectric constant value 27; the additional simulant ingredients being essentially lossless based on each of their respective ε"<0.0007, thereby constraining the LLL mixture equation to this set of potential additional simulant ingredients;

determining a percentage by weight for each of the additional simulant ingredients that are to be mixed with the first two simulant ingredients, by solving the LLL mixture equation constrained by assigning the variable $\varepsilon_{mixture}$ along with characteristics of the first two simulant ingredients and selection of additional simulant ingredients, to obtain corresponding respective mass fractions indicating respective % w/w of each of the additional simulant ingredients to form the simulant mixture in satisfaction of the LLL mixture equation; and mixing the corresponding additional simulant ingredients with the first two simulant ingredients, according to values for the additional simulant ingredients as indicated by the LLL mixture equation as constrained by the morphology established by the first two simulant ingredients, to produce the simulant mixture expressing the simulant reflectivity matching the threat reflectivity R of the target threat to be simulated.

2. The method of claim 1, wherein the curved solution space corresponds to the curved solution space for reflectivity $$R = \left|\frac{1-N}{1+N}\right|^2,$$

wherein $N=\sqrt{\varepsilon'-j\varepsilon''}$, based on a coordinate system wherein the x-axis represents dielectric constant ε', and the y-axis represents loss factor ε".

3. The method of claim 1, wherein the LLL mixture equation expresses weight proportion $w_i$ and density $\rho_i$ values for the plurality of i simulant ingredients as expressed by:

$$\varepsilon_{mixture}^{1/3} = \frac{\Sigma_i w_i \frac{\varepsilon_i^{1/3}}{\rho_i}}{\Sigma_i w_i \frac{1}{\rho_i}},$$

wherein $\varepsilon=\varepsilon'-j\varepsilon''$.

4. The method of claim 3, further comprising solving an n-dimensional ingredient solution space based on the LLL mixture equation, whose surface corresponds to a solution for n weight proportions of n simulant ingredients selected from the additional simulant ingredients.

5. The method of claim 4, further comprising bounding the n-dimensional ingredient solution space to a desired subset of at least one of the n simulant ingredients based on adjusting a given characteristic of the simulant to generate a corresponding adjustment effect on remaining characteristics of the simulant.

6. The method of claim 1, further comprising melting together the first two simulant ingredients, comprising 20% petrolatum melted by total weight and 20% stearic acid melted by total weight corresponding to selecting the putty morphology, and mixing with the additional simulant ingredients of 60% by total weight to produce the simulant having the putty morphology.

7. The method of claim 1, wherein the graph of the curved solution space comprises plotting ε' on an x-axis and plotting ε" on a y-axis satisfying a non-reduced reflectivity equation expressed as $$1-R+(1-R)\sqrt{\varepsilon'\varepsilon'+\varepsilon''\varepsilon''}-(1+R)\sqrt{2\sqrt{\varepsilon'\varepsilon'+\varepsilon''\varepsilon''}+2\varepsilon'}=0.$$

8. The method of claim 6, wherein the additional simulant ingredients of 60% by total weight comprise 46% low loss dielectric filler powder of dielectric constant value 7 by total weight, 8% low loss dielectric filler powder of dielectric constant value 12 by total weight, and 6% low loss dielectric filler powder of dielectric constant value 27 by total weight, to achieve the simulant reflectivity of 0.0735.

9. The method of claim 6, wherein the additional simulant ingredients of 60% by total weight comprise 33% low loss dielectric filler powder of dielectric constant value 7 by total weight and 27% low loss dielectric filler powder of dielectric constant value 12 by total weight, to achieve the simulant reflectivity of 0.0737.

10. The method of claim 6, wherein the additional simulant ingredients of 60% by total weight comprise 19% stearic acid powdered by total weight and 41% low loss dielectric filler powder of dielectric constant value 27 by total weight, to achieve the simulant reflectivity of 0.0733.

11. The method of claim 1, further comprising melting together the first two simulant ingredients, comprising 23% petrolatum melted by total weight and 23% stearic acid melted by total weight corresponding to selecting the paste morphology, and mixing with the additional simulant ingredients of 54% by total weight to produce the simulant having the paste morphology.

12. The method of claim 11, wherein the additional simulant ingredients of 54% by total weight comprise 14% stearic acid powdered by total weight and 40% low loss dielectric filler powder of dielectric constant value 12 by total weight, to achieve the simulant reflectivity of 0.0725.

13. The method of claim 1, further comprising melting together the first two simulant ingredients, comprising 17% petrolatum melted by total weight and 17% stearic acid melted by total weight corresponding to selecting the wet sand-like morphology, and mixing with the additional simulant ingredients of 66% by total weight to produce the simulant having the wet sand-like morphology.

14. The method of claim 13, wherein the additional simulant ingredients of 66% by total weight comprise 24% stearic acid powdered by total weight and 42% low loss dielectric filler powder of dielectric constant value 27 by total weight, to achieve the simulant reflectivity of 0.0742.

* * * * *